United States Patent [19]
Gazis et al.

[11] Patent Number: 5,610,821
[45] Date of Patent: Mar. 11, 1997

[54] OPTIMAL AND STABLE ROUTE PLANNING SYSTEM

[75] Inventors: Denos C. Gazis, Katonah; Robert S. Jaffe, Shenorock; William G. Pope, Somers, all of N.Y.

[73] Assignee: IBM Corporation, Armonk, N.Y.

[21] Appl. No.: 341,715

[22] Filed: Nov. 18, 1994

[51] Int. Cl.⁶ .................................................. G06F 165/00
[52] U.S. Cl. .................. 364/444.2; 364/436; 364/449.1; 340/990; 340/995
[58] Field of Search ................................. 364/436, 443, 364/449, 460, 461, 444; 340/988, 990, 991, 905

[56] References Cited

U.S. PATENT DOCUMENTS

| | | | |
|---|---|---|---|
| 4,015,804 | 4/1977 | Dobler et al. | 246/5 |
| 4,301,506 | 11/1981 | Turco | 364/424 |
| 4,350,970 | 9/1982 | von Tomkewitsch | 340/23 |
| 4,357,593 | 11/1982 | von Tomkewitsch | 340/23 |
| 4,819,174 | 4/1989 | Furuno et al. | 364/449 |
| 4,954,958 | 9/1990 | Savage et al. | 364/436 |
| 4,979,118 | 12/1990 | Kheradpir | 364/436 |
| 5,083,256 | 1/1992 | Trovato et al. | 364/436 |
| 5,132,684 | 7/1992 | Pecker et al. | 340/905 |
| 5,164,904 | 11/1992 | Sumner | 364/436 |
| 5,172,321 | 12/1992 | Ghaem et al. | 364/444 |
| 5,173,691 | 12/1992 | Sumner | 340/905 |
| 5,182,555 | 1/1993 | Sumner | 340/905 |
| 5,220,507 | 6/1993 | Kirson | 364/444 |
| 5,257,023 | 10/1993 | Furuya | 340/995 |
| 5,272,638 | 12/1993 | Martin et al. | 364/444 |
| 5,297,049 | 3/1994 | Gurmu et al. | 364/436 |
| 5,369,591 | 11/1994 | Broxmeyer | 364/436 |

OTHER PUBLICATIONS

IEEE Trans. on Vehicular Tech. vol. VT-29 #2 5/80 pp. 216–225 "Function, Equipment, and Field Testing of a Route Guidance and Info . . ." P. Braegas.

*Primary Examiner*—Gary Chin

[57] ABSTRACT

A system for providing a centrally planned, completely general routing system that assigns traffic routes to maintain optimal traffic system stability. The system includes a plurality of fixed computers, linked by a wide area network, which can communicate seemlessly with all vehicles in a region via a wireless communication system. The system is interactive, in that the fixed computers receive data such as desired route, position and segment transit time data from individual in-vehicle computer units and determine and communicate the system optimal route to each such in-vehicle unit.

11 Claims, 7 Drawing Sheets

OPTIMAL AND STABLE ROUTE PLANNING SYSTEM

FIELD OF THE INVENTION

The present invention relates to vehicle route planning systems, and in particular, to a system for maintaining optimal vehicle traffic flow.

BACKGROUND OF THE INVENTION

Today, vehicle drivers generally use paper maps, or in some cases electronic maps, to guide them to their destinations. Thus, drivers select their routes based on static data, generally resulting in non-optimal use of the road network under actual conditions. This is because congestion information is not known to drivers and as a result they are not able to navigate so as to avoid the congestion. Anecdotal traffic and road condition information is occasionally available from radio broadcasts, and in rare instances by variable message signs that have been installed in the infrastructure. Such information sources, however, are sparse in the information that they convey and difficult for many drivers to act upon. For example, for a driver unfamiliar with an area, information such as "congestion ahead" from a variable message sign will not provide sufficient information to allow the driver to alter his original route. Non-recurring congestion (e.g., traffic accidents) can cause immense traffic tie-ups and delays. If drivers upstream from these events had adequate information about the congestion and about alternative routes, however, the resulting congestion could be rackreduced. In addition, if a plurality of alternative routes are available and if the drivers could be guided in such a way as to optimally use the alternative routes, then the congestion resulting from an incident, as well as from normal traffic patterns, could be greatly minimized.

U.S. Pat. No. 5,172,321 teaches a method by which dynamic traffic information is communicated to vehicles over a wireless modality so that route selection algorithms in the vehicle can select an optimum route. This is an improvement, but can itself result in unstable traffic flow. Each vehicle receives the same information, and drivers have no knowledge of the route selections of other drivers, allowing the likely possibility of subsequent traffic instability (e.g., traffic jams) if many vehicles choose the same alternate route based on the same information. This system requires a high bandwidth to communicate all dynamic traffic data to all cars in areas with a dense road infrastructure. As a result, to be practical, the system must limit its information broadcast to traffic conditions of the most heavily traveled routes.

As can be seen, a need has arisen for a system for determining optimal traffic flow based upon current and projected traffic and road information, and for communicating that information to vehicles.

SUMMARY OF THE INVENTION

The present invention solves the above-identified problems with the prior art by providing a system for determining optimal vehicle routes using current traffic flow information received from individual vehicles.

More particularly, the invention is an optimal route planning system, comprising: one or more fixed computers connected via a wide area network, the computers storing a model of a road network specifying the geometry of road segments and traffic characteristics of the road segments; communication means allowing fixed and wireless communication between the fixed computers and mobile in-vehicle computer units, and also fixed communication among the fixed computers; means in the fixed computers for computing an optimal route for each vehicle based upon data supplied by the in-vehicle units; and means for communicating optimal route information to the in-vehicle units.

FIGURES

DETAILED DESCRIPTION OF THE PREFERRED EMBODIMENT

Figure 1:
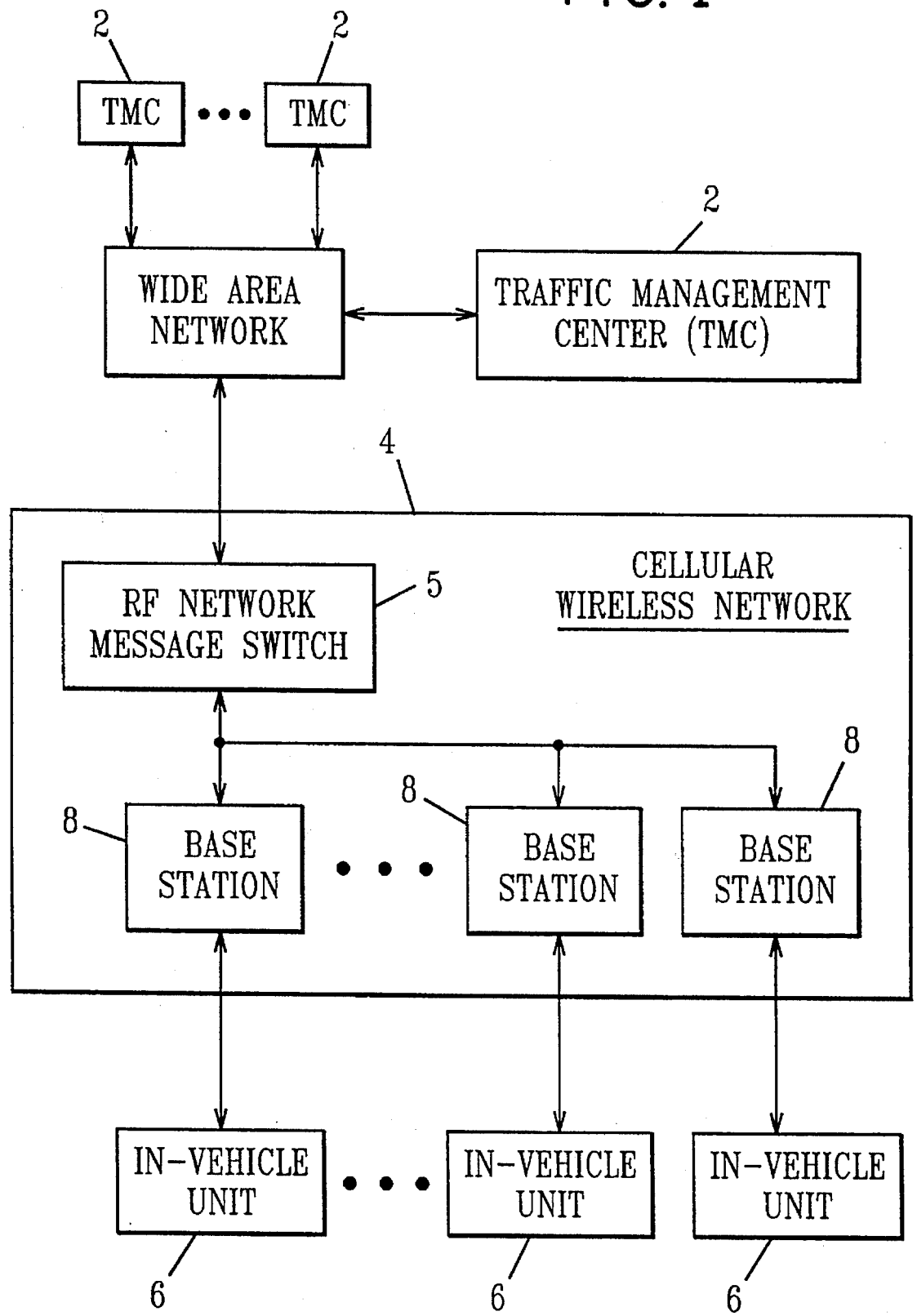
FIG. 1 is a block diagram of a transportation network optimal and stable route planning system in accordance with the present invention.

FIG. 1 is a block diagram of a preferred embodiment of the present invention. The system includes a plurality of traffic management centers 2 ("TMC") located throughout a region of interest. The TMC's act as local data processing stations for communicating both with vehicles in the area (via a communication service provider), as well as with other sources of traffic information and TMC's, to calculate an optimal routing scheme. The function of the TMC's is to provide traffic congestion modelling, trip planning and route selection for vehicles in the system. This information is conveyed to the vehicles in the form of path vectors, travel advisories, mayday responses and GPS differential correction data.

The TMC's are nodes on a wide area network (e.g., ADVANTIS), with communication capability being provided by, in a preferred embodiment, a fixed data network 4 (e.g., a cellular wireless network) by means of an RF network message switch 5. The network 4 also provides means for TMC communication with a plurality of in-vehicle communication and processing units 6 located in vehicles participating in the system via a wireless data network service provider. The wired and wireless network communication service providers are connected ("bridged") together as is the practice today. The network includes a plurality of base stations 8 located in strategic geographic locations as is common in the existing cellular mobile phone system to ensure broad, uninterrupted coverage of a particular region.

Figure 2:
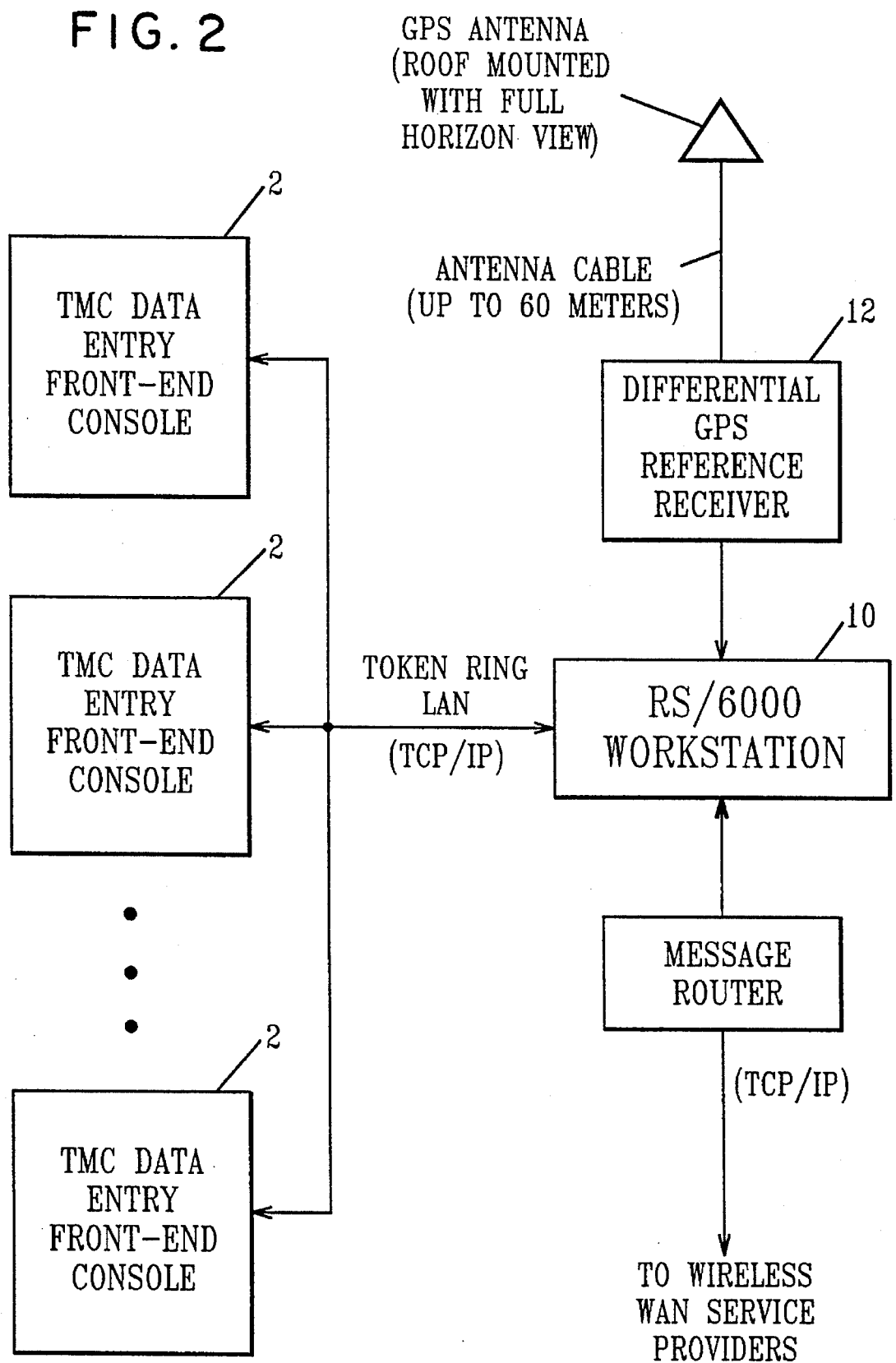
FIG. 2 is a block diagram of the Traffic Management Center (TMC) depicted in FIG. 1.

A preferred TMC 2 is shown in FIG. 2. Each TMC comprises a base processing unit 10. In a preferred embodiment, the base processing unit is an IBM RS6000 workstation, but any comparable device can be employed without departing from the spirit or the invention. The processing unit 10 is connected via a wide area network to public safety and emergency service providers, such as local police, fire and ambulance services, as well as to private service sources such as road service providers. The processing unit 10 also receives, via antenna 12, positioned at a known location, Global Positioning System (GPS) signals from GPS satellites, and acts as a differential GPS correction data reference receiver for determining precise locations of vehicles within its geographical area.

A wireless cellular digital packet data communication modality e.g., CDPD (Cellular Digital Packet Data) is used which can support short but frequent communications between vehicles equipped with mobile computers and one of the TMC's. Each TMC is responsible for servicing the travel data needs of the vehicles in a unique geographic territory.

The communication protocols can follow the TCP/IP suite of open protocols used in the Internet wide area data network communication scheme. In this way, each TMC is assigned an "internet protocol ("IP") address", and likewise each vehicle computer is assigned an IP address.

Each base unit is equipped with a complete database of road segments ("links") for the entire nation. Each road segment is a uniquely numbered record in the database that includes a latitude and longitude for each end of the road segment, and a pair of pointers to two lists of record numbers each representing other road segments connected to either end of the road segment. In this way, the database contains the most essential geometric information to detail the connectivity of any location on a road segment to any other road segment. In addition to this specific static data, fields are provided in the database for dynamic road segment attributes ("link time") such as time required to transit the road segment in either direction, and fields to represent expected occupancy of the road at future times as a result of vehicle travel plans computed by a TMC. A field is also provided to indicate the geographic TMC territory (TMC ID) that a road segment resides in. Each link record may have additional attributes that make the link "navigable", such as one-way restrictions, physical turn restrictions, administrative turn restrictions, etc.

The TMC is provided with route planning algorithms so that an optimal or near optimal shortest time route can be selected for a vehicle based on the road database static connectivity information and individual road segment expected delay times. The TMC may also be equipped with algorithms to optimize routes based on other criteria, possibly selected by the driver, such as cheapest route (shortest time constrained to minimize cost), or least acceleration/deceleration (to minimize pollution and/or fuel consumption).

Figure 3:
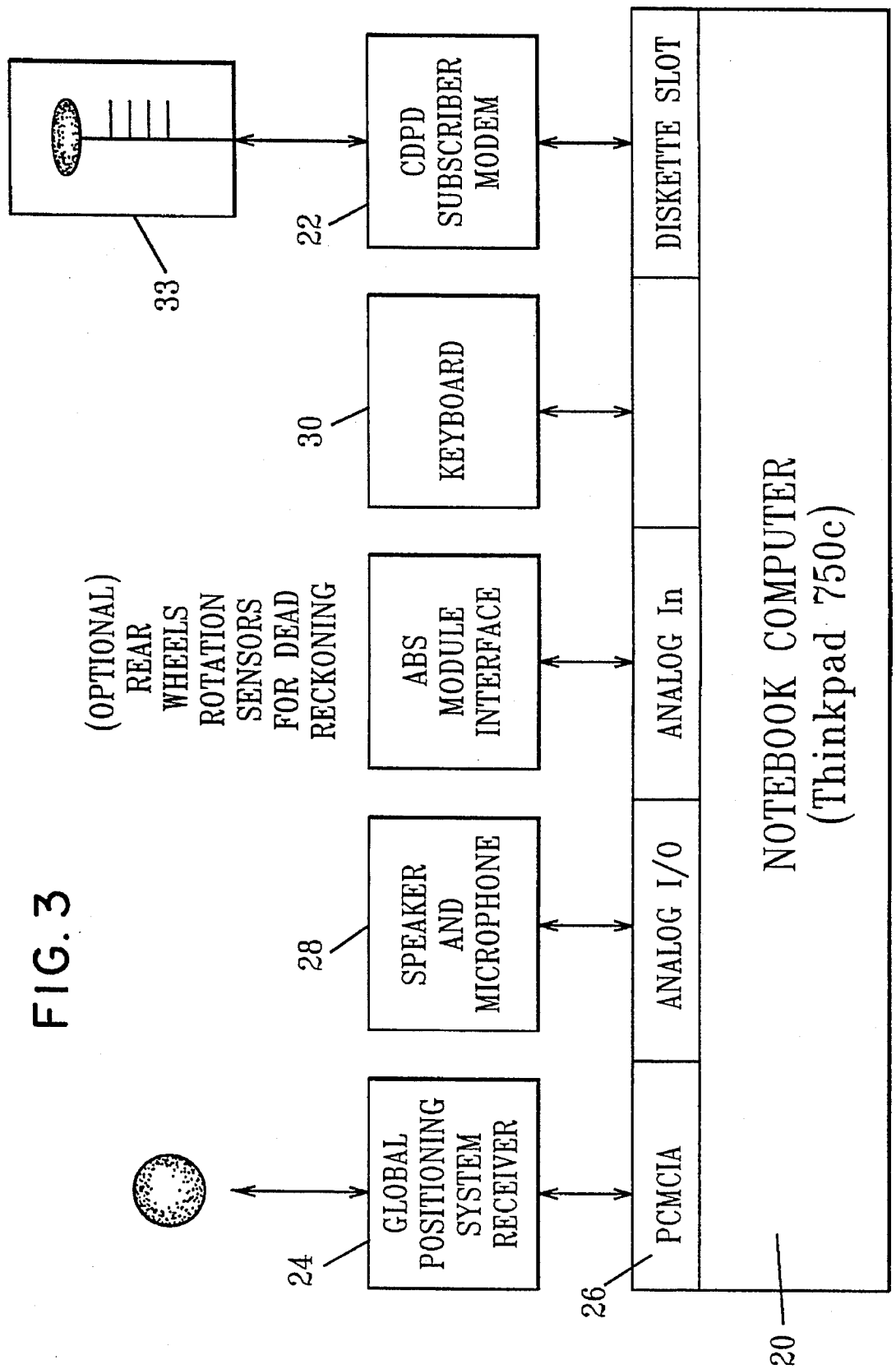
FIG. 3 is a block diagram of a preferred embodiment of the in-vehicle communication and processing unit depicted in FIG. 1.

FIG. 3 shows a preferred in-vehicle communication and processing unit 20 for use in the system. The unit preferably is an IBM Thinkpad computer, but any comparable computing unit equipped with a communications and location determination interface can be used without departing from the invention. The in-vehicle unit includes a wireless data modem 22 acting as an interface between the unit 20 and the wide area network antenna 33. A GPS receiver 24 is provided for generating vehicle position data, which, when combined with GPS differential correction data of the local TMC, will yield precise vehicle position. The GPS receiver 24 is linked with the in-vehicle unit via PCMCIA slot 26, but any other data interface would not depart from the scope of the invention. It is, therefore, the function of the in-vehicle units to provide the TMCs with trip planning, location and route guidance information. This information is in the form of destinations and travel preferences, actual link travel times and intersection delay queues; and also mayday requests.

It should be understood by those skilled in the art that alternative position sensing means can be employed without departing from the scope of the invention. For instance, the following are acceptable positioning systems: solid-state gyroscope for inertial dead reckoning; solid-state gyroscope and odometer for inertial dead reckoning; wheel encoder and flux gate compass for dead reckoning; GPS or differential GPS augmented by any dead reckoning method.

The in-vehicle unit is augmented with a keyboard 30 to allow the operator to give simple commands to the computer while driving, such as: repeat last instruction; repeat remaining instructions; give current location; and next navigation way point.

In an alternative embodiment, vehicles can be supplied with low-end personal computers (e.g., notebook computers or palm-top computers) running a simple DOS operating system. In addition, a cost reduced version could be implemented that does not have a general purpose computer at all, but rather an "application-specific" electronic "Navigation Computer". This computer or application-specific unit would connect to or have integrated therewith an antenna for the wireless data communication means, and possibly in addition an antenna or other sensor connections for the position/location subsystem.

A speaker and microphone system 28 are provided to allow interaction between the driver and in-vehicle unit. The unit can be provided with speech recognition and synthesis capability to allow the driver to communicate a desired destination, route, speed, etc., and in turn receive synthesized instructions for reaching the destination. Other driver interfaces are possible and would not depart from the scope of the invention.

The optimal and stable route planning system of the present invention works as follows. Before proceeding with a trip, the driver, using his mobile computer, interacts with the TMC 2 over the wireless system to identify a destination. The starting location is communicated to the TMC from the vehicle position subsystem. Subsequently, the TMC computes a "best" route based on the driver's criteria (e.g., "shortest time") and the TMC's awareness of the routes selected by other travelers, and then sends to the in-vehicle computer a list of road segments and their expected characteristics (e.g., time to transit) that the in-vehicle computer can use to assist the driver in navigating.

The driver begins the trip, following detailed navigation instructions "spoken" by the mobile computer. Instructions may be spoken as taught in U.S. Pat. No. 5,177,685 "Automobile navigation system using real time spoken driving instructions," incorporated herein by reference. The frequency of the instructions can be presented to the driver in descending logarithmic distance to each waypoint, for example:
"Take a right in 10 miles."
"Take a right in 5 miles."
"Take a right in 2 miles."
"Take a right in 1 mile."
"Take a right in 0.5 miles."
"Take a right in 0.2 miles."
"Take a right in 0.1 miles."
"Take a right in 250 feet."
"Take a right in 100 feet."

The driver can select the logarithmic spacing of the navigation instructions to suit personal preferences.

As each road segment is transited by the vehicle, the on-board computer records the time it took to transit the road segment, and transmits this information over the wireless communication means to the TMC, which uses this information to update its model of the road segment for future travel planning. In this way, each vehicle acts as a probe to measure the real-time dynamic transit information of the road network. The probe data is also used to update the location of the vehicle and its expected future progress through the road network.

The TMC 2 is programmed to sense significant changes in the transit time of a road segment, due perhaps to a non-recurring incident. This program is able to filter out "outlier" events due to vehicles stopping for random events that do not impact traffic flow (e.g., pulling over to the side of the road to pickup or discharge passengers or cargo).

When the TMC detects a significant change in a road segment's traffic parameters, it searches its list of travel plans to see if any en route vehicles would be affected, and if so, it computes new travel plans for those vehicles. If the new travel plans result in significantly better performance based on the driver's criteria, the new plan and an explanation for the change will be sent over the wireless means to the vehicle's mobile computer. The travel advisory explanation can also be enunciated to the driver using the synthesis means, along with the new travel plan and specific navigation directions.

The specific details of guiding a driver using computer generated instructions to follow a particular route are well known in the art and are described in U.S. Pat. Nos. 5,031,104, 4,992,947, 4,939,662, 4,937,751, 4,782,447 and 4,733,356, incorporated herein by reference.

Each TMC computer has a geographic territory for which it is responsible. Each TMC operator updates the static information (e.g., road geometry, one-way restrictions, etc.) in his TMC computer's database to correspond to the actual road infrastructure. Changes to the static part of the road database will be broadcast to all the other TMCs over the wide area network.

When a TMC is computing a route for a client vehicle in its territory, and the destination (or any part of the route) is outside the territory, the optimum path algorithm will request over the wide area network dynamic data for specific road segments from the TMC that owns the territory in which the road segment resides. Furthermore, when a route is selected, the TMCs owning the selected road segment will be notified of the expected time that the vehicle will be occupying the specific road segments, so that a properly timed "token" can be instantiated in the database record to allow for the expected occupancy of the vehicle at an approximate time.

When substantial numbers of vehicles cross the boundaries of TMCs, it may be necessary to implement an even tighter coupling of the operations of several contiguous TMCs, involving a cooperative computation of the routes for all the client vehicles in a set of cooperating TMCs. Such cooperative processing can be implemented, for example, over a high-bandwidth, Asynchronous Transfer Mode (ATM) network.

In order to enhance the reliability of the system, the dynamic data in each TMC can be shadowed in at least one other TMC, so that if any TMC should become unavailable due to maintenance or failure, the load can be picked up by another TMC. This will require a high availability message "router" 11 to be associated with each TMC. The message router senses when a TMC is non-operational, then forwards messages for a particular TMC to the designated backup TMC. High availability routers can be constructed using any of a number of techniques well known in the art (e.g., triple modular redundancy and uninterruptable power supplies), and in general will be expected to be much cheaper to construct than a high availability TMC.

When a vehicle sends a message to a TMC (such as a transit time message) that should be redirected to a different TMC (such as when a vehicle crosses a TMC territorial border), the message is forwarded to the correct TMC, and the vehicle computer is sent a message indicating the correct address for the TMC controlling the territory it has just entered.

The algorithmic task of route selection for a large number of drivers is fairly complex, if one wishes to achieve global optimization of a system involving many drivers. Moreover, the optimization may be difficult to achieve if a large number of drivers choose not to follow the routing instructions provided by the TMC. For this reason, a route selection process which results in a very complex path involving many turning movements may be unattractive to drivers, particularly if it does not ultimately result in very superior performance. Another factor pointing to the desirability of selecting relatively "smooth" route choices is the possible desire of drivers to confine their choice of routes to a few relatively known alternatives. For these reasons, a possible choice of implementation of the invention involves offering drivers an indication of the best of several pre-designed route choices from a given origin to a given destination. A variant of this alternative, applicable to arbitrary origins and destinations, is to offer drivers the best of a few alternate routes between key "nodes" in a network, plus an optimum route from the driver's origin to a starting node, and from a terminal node to the driver's destination.

Figure 5:
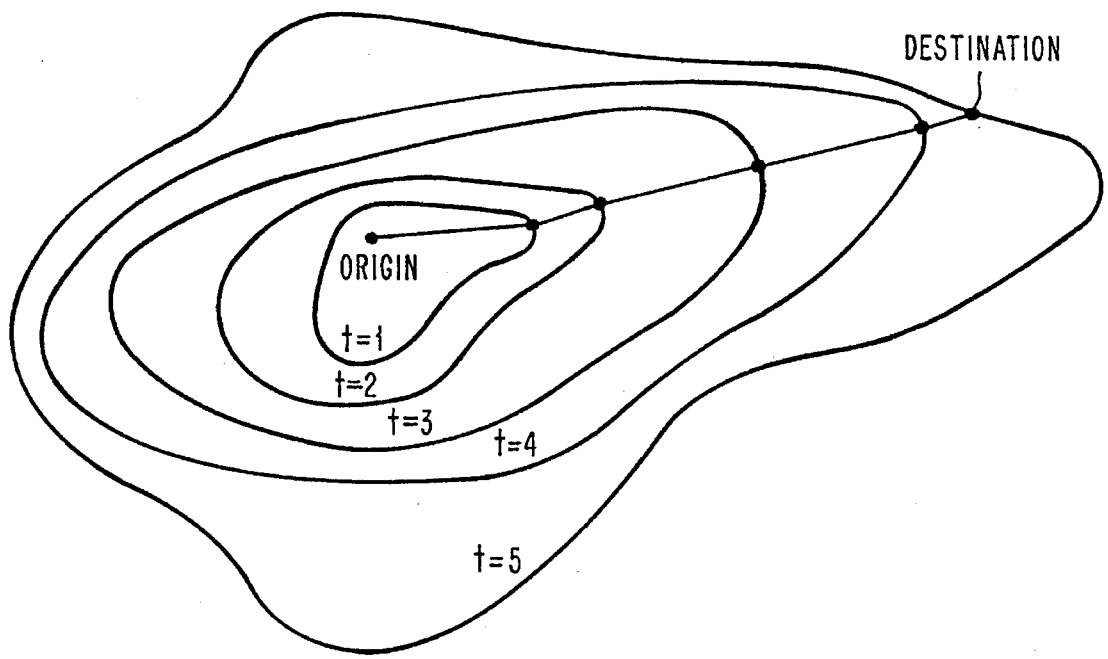
FIG. 5 is an iso-time diagram illustrating the prior art Djikstra algorithm.

Many methods for computing optimal shortest time (or shortest distance) routes between two locations on a map are known in the art. One of the earliest, known as the "Djikstra" algorithm, begins with one of the locations and expands from that point perimeters of "iso-time". That is, it takes exactly the same time to get to any location on the iso-time perimeter. The perimeter is continuously expanded one road segment at a time, until an iso-perimeter intersects the destination. Finally, the route to the destination is computed by "backtracking" from the last iso-time perimeter (which represents the total travel time) to the first iso-time perimeter (which represents the first route segment). An iso-time configuration is shown in FIG. 5.

Figure 6:
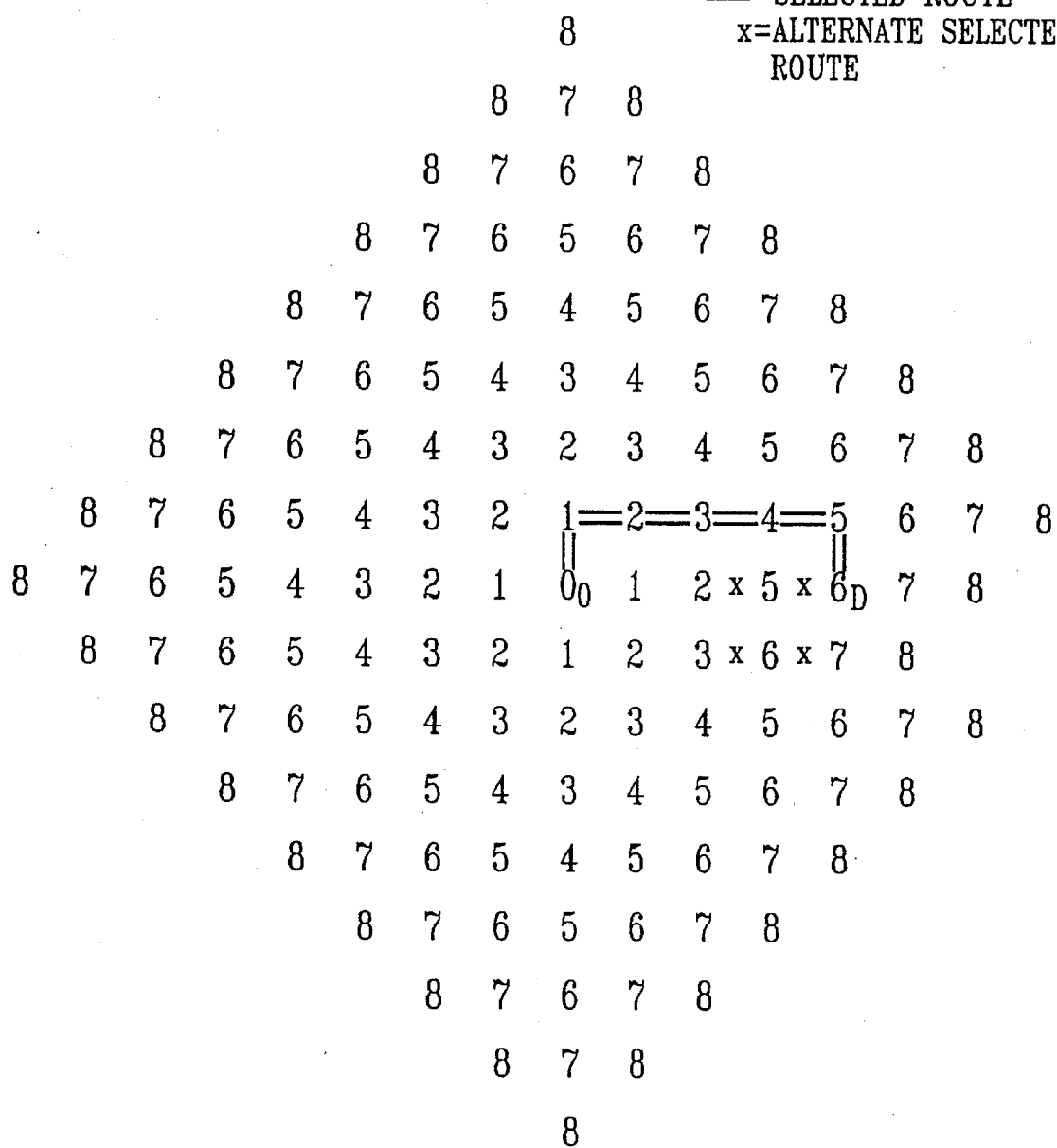
FIG. 6 shows how the Djikstra algorithm, as used with the present invention, operates in the presence of blocked streets.
Figure 7:
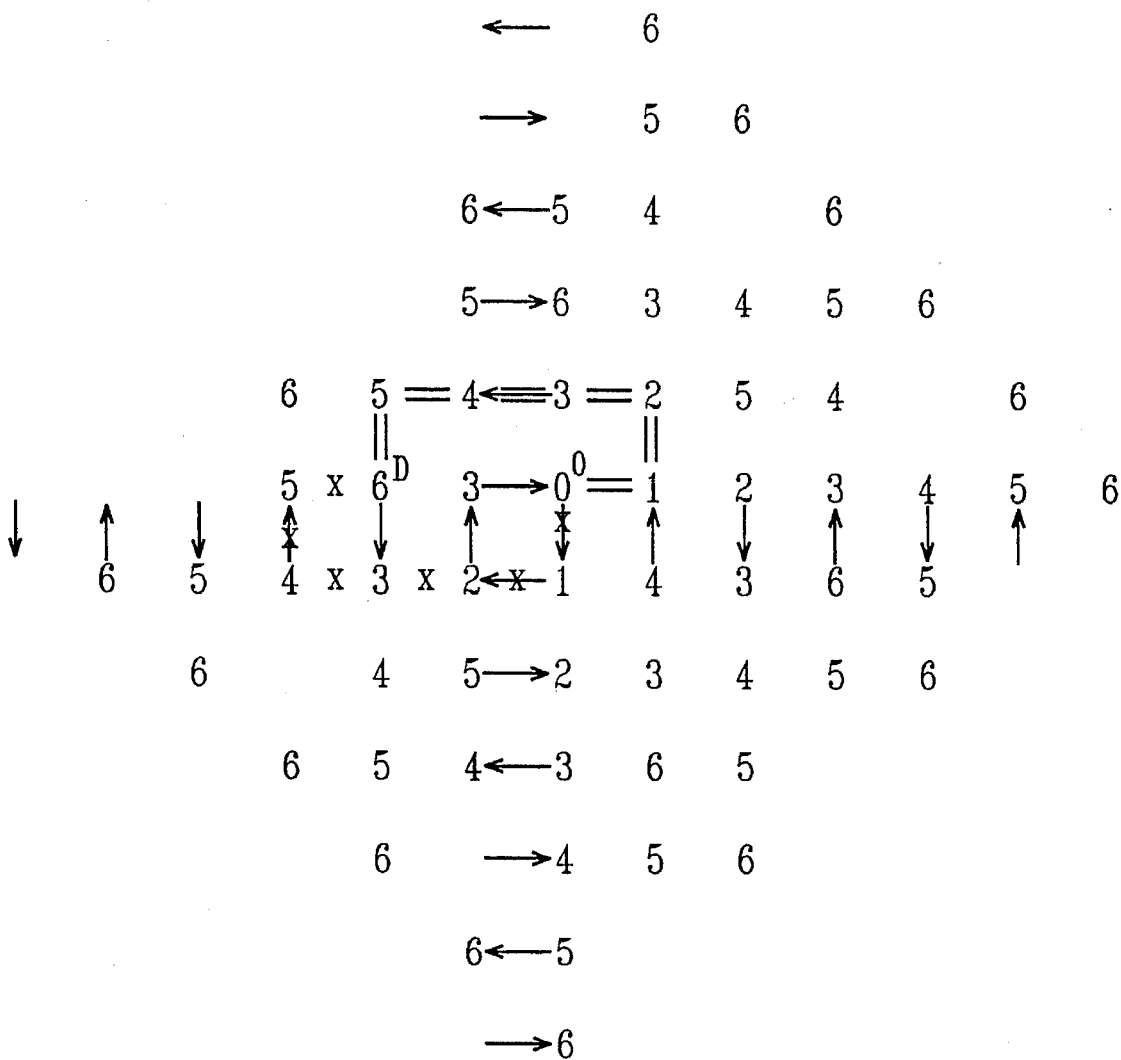
FIG. 7 shows how the Djikstra algorithm, as used in the present invention, operates in the presence of one-way streets.

FIGS. 6 and 7 show how the Djikstra algorithm works in the presence of blocked streets. The X's in the grid indicate streets that are closed. Like numerals indicate a like iso-time perimeter, i.e., the same amount of time to reach that destination from the origin O. As shown in FIG. 6, various ones of the streets could also be slower or faster, accumulating more or less time to transit. In the invention, the queue delay at intersections will be accumulated as well, considering the different delays for left turns, right turns and no turns.

FIG. 7 shows how the Djikstra algorithm works in the presence of one-way streets. FIG. 7 indicates that there are two alternative routes from the given origin to the destination. Based on the actual congestion on the individual links, resulting in longer link travel times, one of the routes may be significantly shorter. If the TMC has already assigned routes to vehicles on one of the routes, the resulting marginal expected congestion caused by these vehicles occupying the links may cause the next routed vehicle to be assigned the alternate route (as the best available route).

Figure 4:
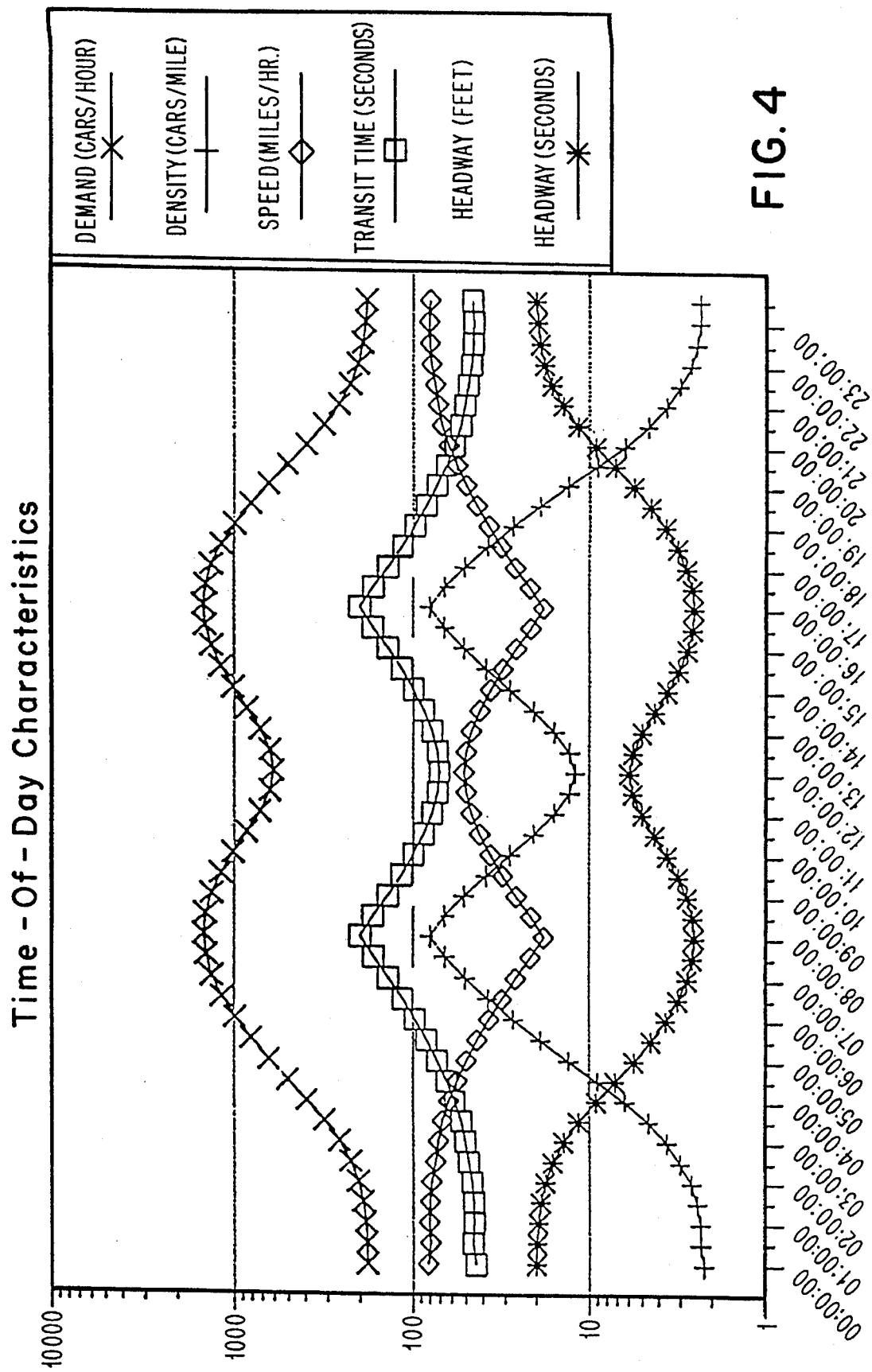
FIG. 4 is a graph showing various traffic data as a function of time of day.

FIG. 4 shows a typical relationship of several link characteristics by time-of-day. Such relationships are well known in the traffic monitoring art.

Vehicle demand is shown in this example to have an AM and PM "rush hour" of about 1800 cars/hour (per lane). At night, the demand drops to under 200 cars/hour.

Vehicle speed at night when uncongested has a "freeflow" of about 80 mph (although drivers will generally limit their speed by "speed limits") but during the rush hours the free flow speed drops to about 20 mph.

Transit time for this one-mile segment is inversely proportional to speed, and varies from about 42 seconds at night to about 2 minutes during the rush hour peaks.

Note that the predicted periodic characteristics for each link will vary based on link geometry and periodic travel demand. In addition, if a large number of vehicles are guided by the TMC, the TMC may be able to influence actual link transit times by diverting vehicles from links with high demand to links with lower demand, thus balancing the load on the road network, resulting in lower travel times for guided vehicles (as well as the beneficial side effect of lower travel times for unguided vehicles since the guided vehicles will be diverted from congested links, leaving them with less congestion).

The TMC is also provided with databases which allow the driver to easily specify locations in latitude and longitude, an address to latitude/longitude database, possibly augmented with a phone number to address database, etc. These databases and their use are well known in the art.

While the invention has been described with respect to preferred embodiments thereof, it will be understood by those skilled in the art the modifications to the disclosed embodiments can be made without departing from the spirit of the invention.

Having thus described our invention, what we claim as new, and desire to secure by Letters Patent is:

1. An optimal route planning system, comprising:
    a network of a plurality of fixed computers connected via a wide area network, the network storing a model of a road network specifying the geometry of road segments and traffic characteristics of the road segments;
    communication means allowing fixed and wireless communication between the network and mobile in-vehicle computer units, and also fixed communication among the fixed computers of the network;
    means provided in each fixed computer in the network for forecasting future occupancy and congestion conditions on the road segments;
    means provided in each fixed computer in the network for computing an optimal route for each vehicle based upon data supplied by the in-vehicle units and based upon the future occupancy and congestion conditions forecasted by the corresponding forecasting means of the corresponding fixed computer; and
    means for communicating optimal route information to the in-vehicle units.

2. The system of claim 1, wherein the means for forecasting uses data relating to the selected routes of a plurality of vehicles covered by the system.

3. The system of claim 1, wherein the data supplied by the in-vehicle comprises units desired route characteristics and destination.

4. The system of claim 1, further comprising vehicle position sensing means coupled to each in-vehicle unit.

5. The system of claim 1, further comprising means in each in-vehicle unit for computing segment transit time and intersection queue delay and reporting transit time to an associated fixed computer in the network.

6. The system of claim 1, further comprising means in the network for detecting unexpected changes in traffic and for rerouting vehicles to new optimal routes.

7. The system of claim 1, wherein each fixed computer in the network comprises means for obtaining dynamic data from other fixed computers.

8. The system of claim 1, wherein the network further comprises shadowing means for maintaining redundant information to prevent the failure of one of said fixed computers in the network from causing communication failure with any vehicle.

9. The system of claim 1, wherein each fixed computer in the network comprises means for an operator to enter congestion delay information about links in the system derived from other sources.

10. The system of claim 1, wherein the vehicle operator can send a "mayday" message, including vehicle location, to one of said fixed computers in the network, whose operator can notify the relevant emergency service and who can send a confirmation message back to the vehicle in distress.

11. The system of claim 1, further comprising:
    each of the fixed computers in the network being associated with a respective geographic region; and
    means, responsive to a transiting vehicle traveling from a first geographic region to a second geographic region, for performing cooperative processing between the fixed computers in the network associated with the first and second geographic regions, and for optimizing the routes of the transiting vehicle.

* * * * *